No. 123,598

UNITED STATES PATENT OFFICE.

JULES WATTEAU, ANTWERP, BELGIUM.

IMPROVEMENT IN COMPOUNDS FOR STRIPPING WOOL OR HAIR FROM THE SKINS OF ANIMALS.

Specification forming part of Letters Patent No. 123,598, dated February 13, 1872.

Specification describing a Chemical Improvement invented by JULES WATTEAU, of Antwerp, in Belgium, to be used in Pulling Wool or Hair from the Skins of Sheep or other animals.

There are taken—
38.50 parts, by weight, of carbonate of soda;
38.50 parts of hydrated oxide of lime;
13 parts of flowers of sulphur;
6.50 parts of pulverized wood-charcoal;
3.50 parts soot.

These elements are pulverized and then intimately mixed together, and the mixture is boiled for about two hours, in a vessel containing about three times its weight of water, thereby producing a liquid of a dark-green color. This liquid, by means of a brush, is spread upon the fleshy side of the skin from which the wool or hair is to be removed. The skins are then placed in a pile, wool against wool, fleshy side against fleshy side, and after a few hours the wool can be pulled with the greatest facility without injury to the skin.

The soot and charcoal are not essential parts of my composition, but enter into it as inert matter, and so remain, as does also the carbonate of lime, which is one of the results of the combination above described. The liquid derives its extraordinary depilating power from the resulting sulpho-sel or double sulphate of calcium and sodium.

I give the proportions of the carbonate of soda, hydrated oxide of lime, and flowers of sulphur, which, in practice, I find to be best; but these proportions may vary considerably.

I am aware of the patents of Tufkin, dated January 31, 1860, reissued April 7, 1863; and Brainard, dated May 20, 1862; and the English patent of Claus, 1,906, granted in 1855; and of the application of Lynds, filed in the Patent Office in September, 1854; but the double sulphate of sodium and calcium is not obtained in any of the combinations and processes therein described. In one or more of them sulphide of sodium and sulphide of calcium are produced, but there is no chemical union between these two sulphides.

By boiling in water, however, as I direct, there takes place a chemical union not otherwise produced, or not produced to so great a degree in any other manner. By the boiling the two sulphides are chemically united at the instant of their formation, giving the double sulphide.

I claim nothing described in said patents and application; but

I do claim—

1. A sulpho-sel, or a double sulphide of sodium and calcium, prepared substantially as described, for the purpose described.

2. Pulling wool from the skins of sheep by means of a double sulphide of sodium and calcium, prepared and used substantially as described.

JULES WATTEAU.

Witnesses:
CH. VAN LIEBERGEN,
MELDERS CHARLES.